United States Patent [19]

Watkins et al.

[11] Patent Number: 4,986,326
[45] Date of Patent: Jan. 22, 1991

[54] RADIAL MOTORCYCLE TIRE

[75] Inventors: David R. Watkins, Birmingham; Gerald A. Griffiths, Walsall; Peter Ingley, Tamworth, all of Great Britain

[73] Assignee: SP Tyres UK Limited, Birmingham, England

[21] Appl. No.: 289,397

[22] Filed: Dec. 20, 1988

Related U.S. Application Data

[63] Continuation of Ser. No. 30,683, Mar. 26, 1987, abandoned.

[30] Foreign Application Priority Data

Apr. 1, 1986 [GB] United Kingdom ............... 8607889

[51] Int. Cl.⁵ .................... B60C 9/02; B60C 15/06
[52] U.S. Cl. .................... 152/532; 152/538; 152/541; 152/554; 152/555
[58] Field of Search ............ 152/541, 538, 517, 546, 152/547, 549, 554, 555, 560, 532, 535

[56] References Cited

U.S. PATENT DOCUMENTS

| | | | |
|---|---|---|---|
| 4,121,641 | 10/1978 | Nakasaki | 152/549 X |
| 4,202,393 | 5/1980 | Ikeda et al. | 152/541 X |
| 4,215,735 | 8/1980 | Sato | 152/555 X |
| 4,640,329 | 2/1987 | Nakasaki et al. | 152/209 R |
| 4,757,850 | 7/1988 | Nakasaki et al. | 152/209 R |

FOREIGN PATENT DOCUMENTS

| | | | |
|---|---|---|---|
| 58-93606 | 6/1983 | Japan | 152/549 |
| 60-213503 | 10/1985 | Japan | 152/560 |
| 60-236804 | 11/1985 | Japan | 152/560 |
| 61-16105 | 1/1986 | Japan | 152/560 |

Primary Examiner—Michael W. Ball
Assistant Examiner—Geoffrey L. Knable
Attorney, Agent, or Firm—Birch, Stewart, Kolasch & Birch

[57] ABSTRACT

A radial tire, specially for a motorcycle, comprising a carcass reinforced by a ply radially disposed cords wrapped in each of two bead regions around an annular bead core to provide a ply turn up, a tread reinforced by a breaker assembly and between the tread edges and bead region tire sidewalls wherein each sidewall includes immediately adjacent to and outwards of the carcass ply a rubber sidewall member modulus in the range 10–20 MPa and having a upper edge positioned at the edge of the breaker and a lower edge radially inwards of the carcass ply turn up edge.

4 Claims, 1 Drawing Sheet

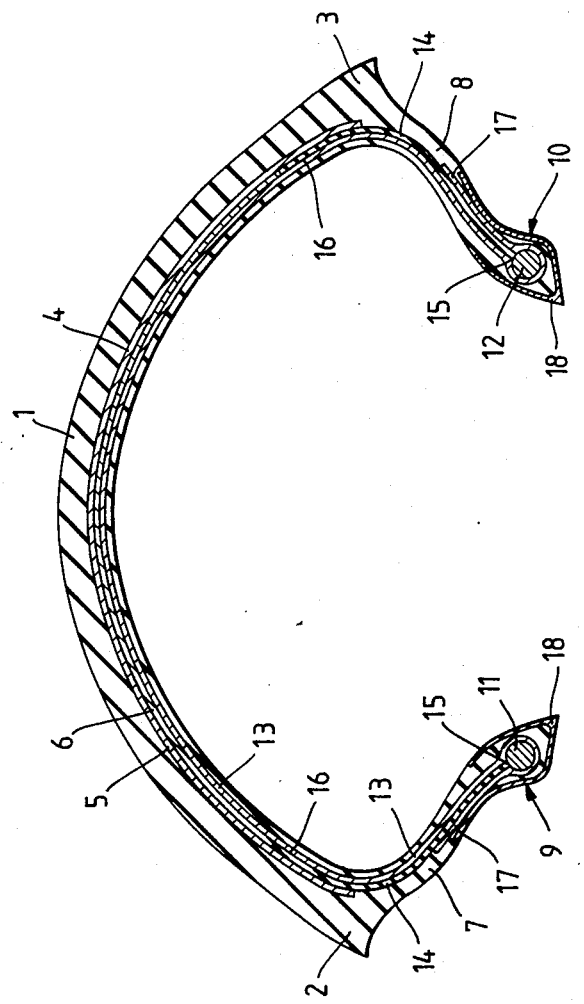

RADIAL MOTORCYCLE TIRE

This application is a continuation of application Ser. No. 07/030,683 filed on Mar. 26, 1987, now abandoned.

The present invention relates to radial tires and in particular to tires for high speed use including racing. It is particularly applicable to motorcycle racing tires but not limited thereto.

High speed radial tires are prone to breaker edge looseness which leads to premature tire failure. Breaker edge looseness occurs due to fatigue in the band between the breaker cords in the edge regions where the breaker joins the sidewall, which is a point in a radial tire where deformations tend to be concentrated.

One object of the present invention is to substantially improve resistance to breaker edge looseness.

Another object, particularly of value in motorcycle tires, is to improve the vehicle handling properties by means of providing an improved total sidewall construction having consistent stiffness properties with minimum sidewall length. Such improvements allow the use of very short sidewall lengths to give lower aspect ratio tires which gives tires still better properties of grip, durability and vehicle handling.

One aspect of the present invention provides a radial tire comprising a carcass reinforced by a ply of radially disposed cords wrapped in each of two bead regions around an annular bead core to provide a ply turn up, a tread reinforced by a breaker assembly and between the tread edges and bead regions tire sidewalls wherein each sidewall includes, immediately adjacent to and axially outwards of the carcass ply, a rubber sidewall member having a modulus in the range of 10-20 MPa and having an upper edge positioned at the edge of the breaker assembly and a lower edge radially inwards of the carcass ply turn up edge.

Preferably the lower edge of the rubber sidewall member is positioned at the bead core and the rubber sidewall member is continuous from the bead core to the edge of the breaker assembly.

In the preferred case of a breaker assembly comprising two or more plies of reinforcement fabric, preferably one outer ply overlies the upper edge of the rubber sidewall member to interconnect the rubber sidewall member and the breaker assembly. This overlie may be between 5 and 10 mm.

The rubber sidewall member is preferably of constant thickness before tire shaping.

One embodiment of the present invention will now be described, by way of example only, in conjunction with the attached diagrammatic drawing showing in cross-section a 325/550-18 radial motorcycle tire intended for high speed motorcycle racing.

The tire comprises a convex tread region 1 having tread edges 2, 3 and reinforced by a tread reinforcing breaker assembly 4. The breaker assembly 4 comprises two tire fabric breaker plies 5 and 6 each of which comprises weftless Kevlar (registered trade mark) cord tire fabric laid with the cords at 25 degrees to the circumferential direction with the cords of ply 5 crossing the cords of ply 6. Ply 5, the outer ply, extends into each tread edge 2 and 3 whereas ply 6 is 5 mm short of ply 5 at each side for a reason to be explained.

The tire further comprises a pair of sidewalls 7 and 8 terminating in bead regions 9 and 10. Said bead region is reinforced by an annular bead core 11, 12. A tire carcass reinforcement ply 13 which comprises a single ply of rayon tire fabric laid with the cords substantially radial extends around the tire and is anchored in each bead 9 and 10 by being wrapped around its respective bead core 11 or 12.

It should be especially noted that no tapered bead apex is provided. Instead a rubber sidewall member 14 is provided in each sidewall. The sidewall members 14 comprise rubber compound having a modulus of 13 MPa (the modulus may be in the range of 10-20 MPa), and including adhesion prompting agents to give high adhesion to the adjacent components in the tire. The sidewall members 14 are of substantially constant thickness being 1 mm thick when assembly of the tire carcass is carried out and extend through the whole sidewall length such that the radially inner edge 15 is substantially in contact with the bead core 11 or 12 and the radially outer edge 16 abuts the edge of the inner breaker ply 6. Thus the sidewall member outer edge 16 is overlaid by the outer breaker ply 5 and securely anchored into the breaker/tread assembly.

The hard sidewall member 14 is immediately adjacent to the carcass ply 13 and bonded thereto along its full length. Finally the carcass ply 13, after wrapping around the bead core 11 or 12 is turned-up on the outside of the tire to a radial height of 15 mm to provide a carcass turn up 17 and the bead includes a cross-woven fabric chafer 18.

The resultant tire has sidewalls 7, 8 each formed by a single radial ply and a rubber reinforcement member 14 anchored to both bead cores 11, 12 and breaker edge. The overlap of the outer breaker ply over the edge of the rubber reinforcement member is particularly important. The sidewall rubber member 14 after tire shaping has its thickness still within 60% of the original thickness along its full length and so provides a substantial rubber reinforcement member. The resultant tire has been found to have greatly improved resistance to breaker edge looseness caused by fatigue on high speed test. The mechanism of this is not yet fully understood but is believed to be due to the hardness of the rubber sidewall member and its continuity through the full length of the sidewall. The tire sidewall may include only the rubber sidewall member outwards of the carcass ply with no further rubber compound components.

It has been found that the sidewall member may have a modulus in the range of 10-20 MPa, more preferably 12-15 MPa.

Suitable rubber sidewall member dimensions for a 18" motorcycle tire are in the ranges of 0.30 to 1.00 mm for thickness and 30 to 80 mm for length.

The carcass ply overlap height is not very critical and may in fact be reduced to zero. In the case of the two breaker ply motorcycle race tire described, however, this height is preferably in the size of 15% to 60% of the sidewall length.

Having now described our invention what we claim is:

1. A motorcycle radial racing tire comprising
   a tread region reinforced by a breaker assembly containing at least an outer breaker ply and a radially inner breaker ply, said outer breaker ply having lateral edges extending beyond lateral edges of the inner breaker ply,
   sidewall portions extending inwardly from both ends of the tread region and terminating in bead regions containing annular bead cores,
   a carcass reinforcement ply comprised of radially disposed cords which extend into the bead regions and wrap around the annular bead cores to provide a carcass ply turn up edge, and a rubber sidewall member having an upper edge and a lower edge, said lower edge being positioned adjacent the bead core, radially inward of the carcass ply turn up edge and extending through the tire sidewall portions immediately adjacent to and axially outwards of the carcass ply with the upper edge thereof being positioned to abut against the lateral edge of the radially innermost positioned breaker ply of said breaker assembly, with the outer breaker ply being in direct contact with and overlying the abutting edges of the inner breaker ply and the rubber sidewall member by between 3 and 10 mm, whereby the breaker assembly is connected with the rubber sidewall member, said rubber sidewall member thus being securely anchored into the breaker tread assembly and having an untapered substantially constant thickness along its length before tire shaping, a thickness at said upper edge that is not less than 60% of its thickness at said lower edge after tire shaping, and a modulus in the range of 10 to 20 MPa.

2. The motorcycle tire according to claim 1 wherein the carcass ply turn up edge is in the range of 15% to 60% of the sidewall length.

3. The motorcycle tire according to claim 1 characterised in that the tread and associated breaker assembly are substantially curved in the transverse cross-section of the tire.

4. The motorcycle tire according to claim 3 wherein the tire sidewall includes only the rubber sidewall member outwards of the carcass ply with no further rubber compound components.

* * * * *